(12) United States Patent
Nakamura

(10) Patent No.: US 10,372,263 B2
(45) Date of Patent: *Aug. 6, 2019

(54) TOUCH SENSOR, TOUCH PANEL AND ELECTRODE STRUCTURE

(71) Applicant: FUJIFILM Corporation, Tokyo (JP)

(72) Inventor: Hiroshige Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,856

(22) Filed: Apr. 26, 2018

(65) Prior Publication Data

US 2018/0246615 A1  Aug. 30, 2018

Related U.S. Application Data

(63) Continuation of application No. 15/166,968, filed on May 27, 2016, now Pat. No. 9,990,083, which is a continuation of application No. PCT/JP2014/077300, filed on Oct. 14, 2014.

(30) Foreign Application Priority Data

Nov. 29, 2013 (JP) ................... 2013-247282

(51) Int. Cl.
*G06F 3/044* (2006.01)
*G06F 3/041* (2006.01)

(52) U.S. Cl.
CPC .......... *G06F 3/0416* (2013.01); *G06F 3/044* (2013.01); *G06F 3/0412* (2013.01); *G06F 2203/04103* (2013.01); *G06F 2203/04112* (2013.01)

(58) Field of Classification Search
CPC . G06F 2203/04103; G06F 2203/04112; G06F 3/0412; G06F 3/0416; G06F 3/044
USPC .................................. 345/170–176
See application file for complete search history.

(56) References Cited

U.S. PATENT DOCUMENTS 9,990,083 B2 *  6/2018  Nakamura ............. G06F 3/044
2011/0157079 A1  6/2011  Wu et al.
2014/0076612 A1  3/2014  Kuriki
2014/0132860 A1  5/2014  Hotelling et al.

FOREIGN PATENT DOCUMENTS

JP  2010-191504 A   9/2010
JP  2010-541109 A  12/2010
JP  2011-138515 A   7/2011

(Continued)

OTHER PUBLICATIONS

Chinese Office Action and English translation for Application No. 201480062772.6, dated Mar. 30, 2018.

(Continued)

*Primary Examiner* — Tony O Davis
(74) *Attorney, Agent, or Firm* — Birch, Stewart, Kolasch & Birch, LLP

(57) ABSTRACT

The touch sensor includes a base, first and second electrodes that are formed on a main surface of the transparent base so as to face each other, and an extraction electrode that is formed on the main surface of the transparent base and extends from the second electrode. The first electrode has a shape which surrounds a portion of the second electrode. At least the extraction electrode is formed in a mesh pattern including a plurality of grids which are formed by thin metal wires.

22 Claims, 9 Drawing Sheets

(56) References Cited

FOREIGN PATENT DOCUMENTS

| JP | 2012-43652 A | 3/2012 |
| JP | 2012-238278 A | 12/2012 |
| JP | 5249806 B2 | 7/2013 |
| JP | 2013-228855 A | 11/2013 |

OTHER PUBLICATIONS

English Translation of the Written Opinion of the International Searching Authority (Form PCT/ISA/237), dated Dec. 16, 2014 for International Application No. PCT/JP2014/077300.
International Search Report for PCT/JP2014/077300 (PCT/ISA/210) dated Dec. 16, 2014.
Japanese Office Action for Japanese Application No. 2013-247282, dated Sep. 20, 2016, with an English translation.
Japanese Office Action, dated Mar. 21, 2017, for Japanese Application No. 2013-247282, with English translation.
Written Opinion of the International Searching Authority for PCT/JP2014/077300 (PCT/ISA/237) dated Dec. 16, 2014.
Chinese Office Action, dated Oct. 19, 2018, for Chinese Application No. 201480062772.6, with an English translation.

* cited by examiner

TOUCH SENSOR, TOUCH PANEL AND ELECTRODE STRUCTURE

CROSS-REFERENCE TO RELATED APPLICATIONS

This application is a Continuation of co-pending U.S. application Ser. No. 15/166,968 filed on May 27, 2016, which is a Continuation of PCT/JP2014/077300 filed on Oct. 14, 2014, and which claims priority under 35 U.S.C § 119(a) to Japanese Patent Application No. 2013-247282 filed Nov. 29, 2013. Each of the above applications is hereby expressly incorporated by reference, in its entirety, into the present application.

BACKGROUND OF THE INVENTION

1. Field of the Invention

The present invention relates to a touch sensor, and more particularly, to a touch sensor suitable for a touch panel and a touch panel.

2. Description of the Related Art

In recent years, a conductive film which is used in a touch panel has drawn attention as a conductive film provided in a display device. This touch panel is mainly applied to a small device, such as a PDA (portable information terminal) or a mobile phone. Increasing the size of the touch panel may be considered for application to, for example, personal computer displays.

As the conductive film for a touch panel, the following examples have been proposed: an example in which a first electrode portion and a second electrode portion face each other, with a substrate interposed therebetween (JP2012-238278A); an example in which lead wire portions are provided in a mesh pattern between a plurality of touch electrode portions which are arranged on a main surface of a substrate at a predetermined interval (JP2012-043652A and JP2010-191504A); and an example in which a touch electrode portion and an opposite electrode are formed on the same plane of a substrate (JP2010-541109A).

SUMMARY OF THE INVENTION

However, regarding the future trend, since a touch electrode and an extraction electrode are made of indium tin oxide (ITO), they have high electrical resistance. Therefore, a structure will be considered in which an extraction electrode is formed by metal wires. Since the extraction electrode is formed in a visible region, there is a problem that the extraction electrode is conspicuous, which results in a reduction in visibility.

In contrast, a structure will be considered in which a plurality of grids formed by thin wires made of metal (thin metal wires) are arranged to form an electrode, thereby reducing surface electrical resistance, as in JP2012-238278A, JP2012-043652A, JP2010-191504A, and JP2010-541109A.

However, in the electrode formed by the thin metal wires, the proportion of a conductive portion is lower than that in a transparent electrode film. Therefore, the initial capacitance between the electrodes is significantly less than that in a transparent electrode film and there is a limitation in improving the accuracy of detection. In particular, in a case in which the first and second electrode portions which face each other, with the substrate interposed therebetween, are provided, there is a concern that the distance between the electrodes will increase and the initial capacitance between the electrodes will decrease. When the initial capacitance is too large, a change in capacitance due to the approach or touch of a finger of a human is relatively small and the accuracy of detection is reduced.

The invention has been made in view of the above-mentioned problems and an object of the invention is to provide a conductive film and a touch panel in which an extraction electrode that is formed in a visible region is inconspicuous to improve visibility, the initial capacitance between electrodes increases to improve the accuracy of detection, and the electrodes are formed on only one main surface of a base to reduce costs.

[1] According to a first aspect of the invention, there is provided a conductive film comprising a base, first and second electrodes that are formed on a main surface of the base so as to face each other, and an extraction electrode that is formed on the main surface of the base and extends from the second electrode. The first electrode has a shape which surrounds a portion of the second electrode. At least the extraction electrode is formed in a mesh pattern including a plurality of grids which are formed by thin metal wires.

According to the aspect, the extraction electrode which is formed in a visible region is less likely to be seen and it is possible to improve visibility. In addition, the initial capacitance between the first electrode and the second electrode can be increased and it is possible to improve the accuracy of detection. The first electrode, the second electrode, and the extraction electrode can be formed on only one main surface of the base. Therefore, it is possible to simplify a manufacturing process, to reduce the number of processes, and to reduce costs.

[2] In the first aspect of the invention, a direction in which the thin metal wire forming the mesh pattern extends may be inclined with respect to a direction in which the extraction electrode extends. In this case, it is possible to suppress the occurrence of moire.

[3] In the first aspect of the invention, when a total length of a path in which a thin metal wire forming a portion that faces the second electrode in the outer periphery of the first electrode and a thin metal wire forming a portion that faces the first electrode in the outer periphery of the second electrode face each other in parallel is L (mm) and an area that is surrounded by the outer periphery of the second electrode is A (mm$^2$), a value of L (mm)/A (mm$^2$) is preferably equal to or greater than 1.0 (mm$^{-1}$). According to the aspect, it is easy to detect a change in capacitance due to the touch or approach of a finger or a pen and it is possible to improve the accuracy of detection of a touch position.

[4] In the first aspect of the invention, a pitch of the mesh pattern is preferably equal to or greater than 200 µm and equal to or less than 300 µm. According to the aspect, in a case in which the conductive film is used in a touch panel, it is possible to maintain transparency at a high level. For example, when the conductive film is attached to a display panel of a display device, it is possible to view a displayed image without discomfort. In addition, it is possible to improve the accuracy of detection of a touch position.

[5] In the first aspect of the invention, a plurality of the second electrodes may be provided. The plurality of second electrodes may be scattered in the form of islands.

[6] In this case, the plurality of second electrodes which are scattered in the form of islands may be arranged in a first direction. The first electrode may include a strip portion which extends in a strip shape in the first direction and a surrounding portion which protrudes from the strip portion and surrounds a portion of the second electrode. According to the aspect, it is possible to widen the range of a sensing portion for detecting the approach or touch position of a finger (referred to as a touch position) and to improve the accuracy of detection of the touch position.

[7] A plurality of the first electrodes may be provided. The plurality of second electrodes which are scattered in the form of islands may be arranged in a matrix. The plurality of first electrodes may be arranged in a second direction perpendicular to the first direction.

[8] In this case, in each extraction electrode which extends from each of the plurality of second electrodes arranged in the first direction, a region which is adjacent to the corresponding first electrode may extend in the first direction. According to the aspect, the first electrode and the second electrode can be formed on one main surface of the base. In addition, since the extraction electrode is formed in a mesh pattern including a plurality of grids which are formed by thin metal wires, the extraction electrode is inconspicuous even when it is formed in a visible region.

[9] The first electrode and the second electrode may be formed in a mesh pattern including a plurality of grids which are formed by thin metal wires. A dummy pattern which is formed by thin metal wires and is not connected to the first electrode and the second electrode may be formed at least between the first electrode and the second electrode. The plurality of grids may be uniformly arranged across at least the first electrode and the second electrode in a top view. According to the aspect, it is possible to prevent some of the thin metal wires or some of the electrodes from being seen. Therefore, visibility is improved.

[10] A dummy pattern which is formed by thin metal wires and is not connected to a plurality of the extraction electrodes may be formed between the plurality of extraction electrodes. The plurality of grids may be uniformly arranged across the first electrode, the second electrode, and the extraction electrode in a top view. In this case, since a plurality of grids are uniformly arranged across the first electrode, the second electrode, and the extraction electrode in a top view of the conductive film, it is possible to prevent some of the extraction electrode from being seen and to further improve visibility.

[11] In the first aspect of the invention, each of the second electrodes may have a shape in which a plurality of branch portions extend radially. The first electrode may have a shape which surrounds at least the plurality of branch portions of the second electrode. In this case, since a portion in which the first electrode and the second electrode face each other has a complicated shape, it is possible to improve the initial capacitance between the first electrode and the second electrode.

[12] In this case, the branch portions which extend radially in the second electrode may be scattered in the form of islands.

[13] The plurality of branch portions may be arranged in the first direction.

[14] In the first aspect of the invention, the first electrode may be formed in a mesh pattern including a plurality of grids which are formed by thin metal wires.

[15] In [1] to [8] and [11] to [14], the second electrode may be formed in a mesh pattern including a plurality of grids which are formed by thin metal wires.

[16] According to a second aspect of the invention, there is provided a touch panel comprising a conductive film that is provided on a display panel of a display device. The conductive film comprises a base, first and second electrodes that are formed on a main surface of the base so as to face each other, and an extraction electrode that is formed on the main surface of the base and extends from the second electrode. The first electrode has a shape which surrounds a portion of the second electrode. At least the extraction electrode is formed in a mesh pattern including a plurality of grids which are formed by thin metal wires.

[17] In the second aspect of the invention, the conductive film may include a sensor region that corresponds to a display screen of the display panel and a terminal wiring region that corresponds to an outer peripheral portion of the display panel. The extraction electrode, the first electrode, and second electrode may be formed in the sensor region.

As described above, according to the conductive film and the touch panel of the invention, since the extraction electrode which is formed in a visible region is less likely to be seen, it is possible improve visibility. In addition, since the initial capacitance between the electrodes is high, it is possible to improve the accuracy of detection. The electrodes can be formed on only one main surface of the base. Therefore, it is possible to reduce costs.

DESCRIPTION OF THE PREFERRED EMBODIMENTS

Hereinafter, embodiments of a conductive film and a touch panel according to the invention will be described with reference to FIGS. 1 to 9B. In the specification, for the term "to" indicating a numerical range, values which are arranged before and after the term "to" are used as a lower limit and an upper limit.

Figure 1:
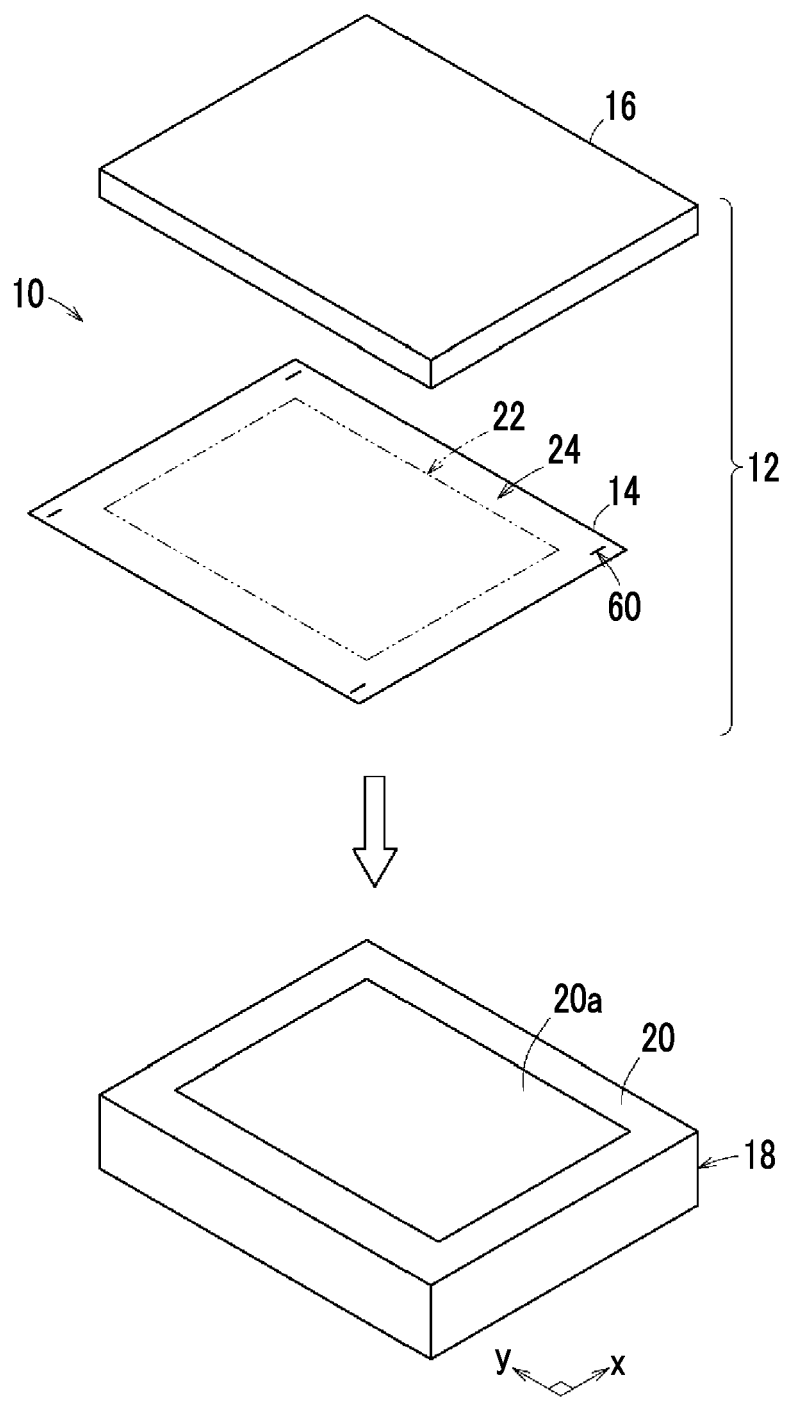
FIG. 1 is an exploded perspective view illustrating the structure of a touch panel according to an embodiment.

As illustrated in FIG. 1, a touch panel 10 according to this embodiment includes a sensor body 12 and a control circuit (for example, an IC circuit) (not illustrated). The sensor body 12 includes a conductive film 14 according to this embodiment and a cover layer 16 which is made of, for example, glass and is stacked on the conductive film 14. The conductive film 14 and the cover layer 16 are provided on a display panel 20 in a display device 18 such as a liquid crystal display. The conductive film 14 include a sensor region 22 which corresponds to a display screen 20a of the display panel 20 and a terminal wiring region 24 (so-called frame) which corresponds to an outer peripheral portion of the display panel 20, as viewed from the top.

Figure 2:
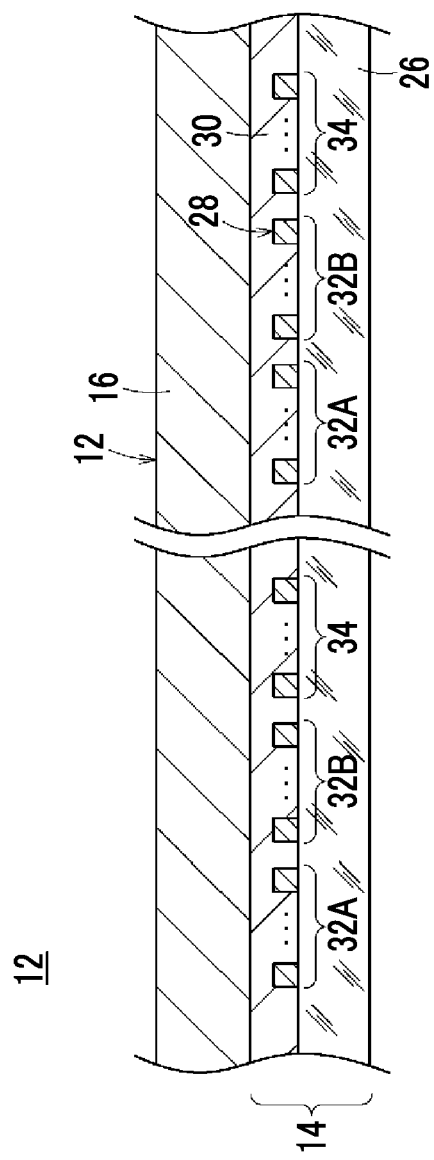
FIG. 2 is a cross-sectional view illustrating a conductive film according to this embodiment together with a sensor body.

As illustrated in FIG. 2, the conductive film 14 includes a conductive portion 28 which is formed on the surface of a transparent base 26 and a transparent adhesive layer 30 which is formed so as to cover the conductive portion 28.

In the sensor region 22, a first electrode 32A and a second electrode 32B of the conductive portion 28 are formed on the surface of the transparent base 26 so as to face each other and an extraction electrode 34 of the conductive portion 28 is formed on the surface of the transparent base 26 so as to extend from the second electrode 32B. The first electrode 32A has a shape which surrounds a portion of the second electrode 32B. At least the extraction electrode 34 has a mesh pattern 38 including a plurality of grids 36 which are formed by thin metal wires.

Specifically, a plurality of second electrodes 32B are provided. The plurality of second electrodes 32B are scattered in the form of islands. More specifically, the plurality of second electrodes 32B which are scattered in the form of islands are arranged in a matrix in a first direction (y direction) and a second direction (x direction: a direction perpendicular to the first direction). It is preferable that a plurality of first electrodes 32A are arranged in the second direction.

In this case, a portion in which the first electrode 32A and the second electrode 32B face each other is a sensing portion for detecting the approach or touch position (referred to as a touch position) of a finger.

Figure 3:
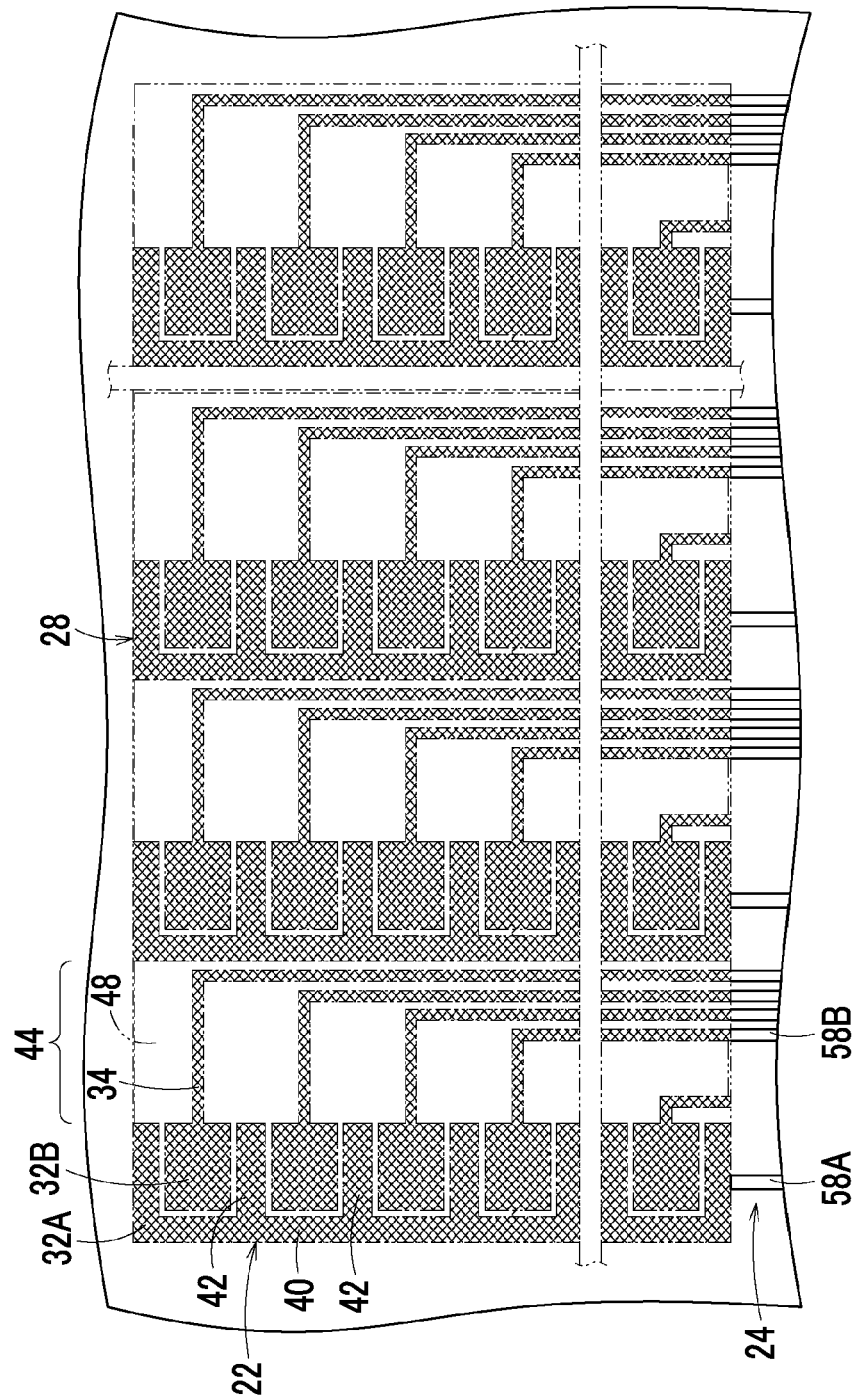
FIG. 3 is a plan view illustrating a pattern of a conductive portion (particularly, a first electrode, a second electrode, an extraction electrode, a first terminal wiring portion, and a second terminal wiring portion) of the conductive film according to this embodiment.

In particular, in this embodiment, for example, as illustrated in FIG. 3, each first electrode 32A includes a strip portion 40 which extends in a strip shape in the first direction and a surrounding portion 42 which protrudes from the strip portion 40 and surrounds a portion of the second electrode 32B. For example, each second electrode 32B is formed in a rectangular shape in a top view. For example, three sides of each second electrode 32B are surrounded by the surrounding portion 42 of the first electrode 32A. Therefore, the range of the sensing portion is widened and it is possible to improve the accuracy of detection of the touch position.

Each of the extraction electrodes 34 which are drawn from the plurality of second electrodes 32B arranged in the first direction extends in the first direction in a region 44 (a region between the first electrodes 32A) that is adjacent to the corresponding first electrode 32A.

A dummy pattern 46 which is not connected to the first electrode 32A and the second electrode 32B may be formed at least between the first electrode 32A and the second electrode 32B. It is preferable that the dummy pattern 46 is formed in a mesh pattern 38 including a plurality of grids 36 which are formed by thin metal wires, similarly to the first electrode 32A and the second electrode 32B.

Therefore, the conductive film 14 has a shape in which a plurality of grids 36 are uniformly arranged across at least the first electrode 32A and the second electrode 32B in a top view. It is possible to prevent some of the thin metal wires or some of the electrodes from being seen and visibility is improved.

Of course, the dummy pattern 46 which is formed by thin metal wires and is not connected to the extraction electrode 34 may be formed between a plurality of extraction electrodes 34. In this case, the conductive film 14 has a shape in which a plurality of grids 36 are uniformly arranged across the first electrode 32A, the second electrode 32B, and the extraction electrode 34 in a top view. It is possible to prevent some of the extraction electrodes 34 from being seen and thus to further improve visibility.

Figure 4:
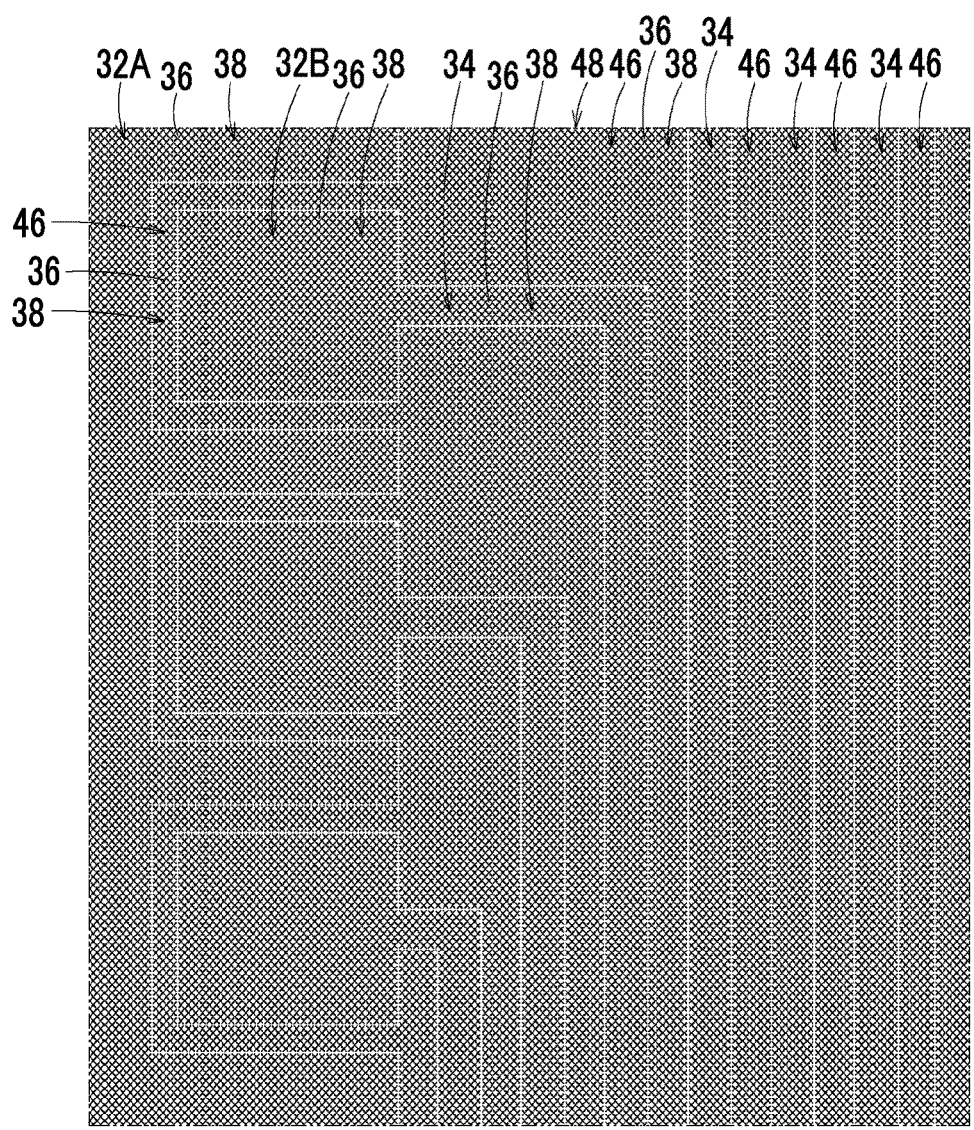
FIG. 4 is an enlarged plan view illustrating an example of the pattern of the first electrode, the second electrode, and the extraction electrode and a dummy pattern illustrated in FIG. 3.
Figure 5A:
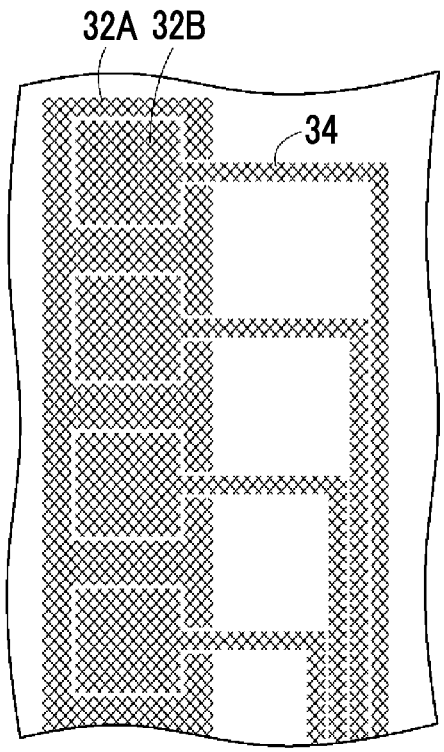
FIG. 5A is a plan view illustrating the pattern of some of the first electrodes corresponding to one column, a plurality of second electrodes each of which is partially surrounded by the first electrode, and the extraction electrodes which extend from the second electrodes in the pattern illustrated in FIG. 3
Figure 5B:
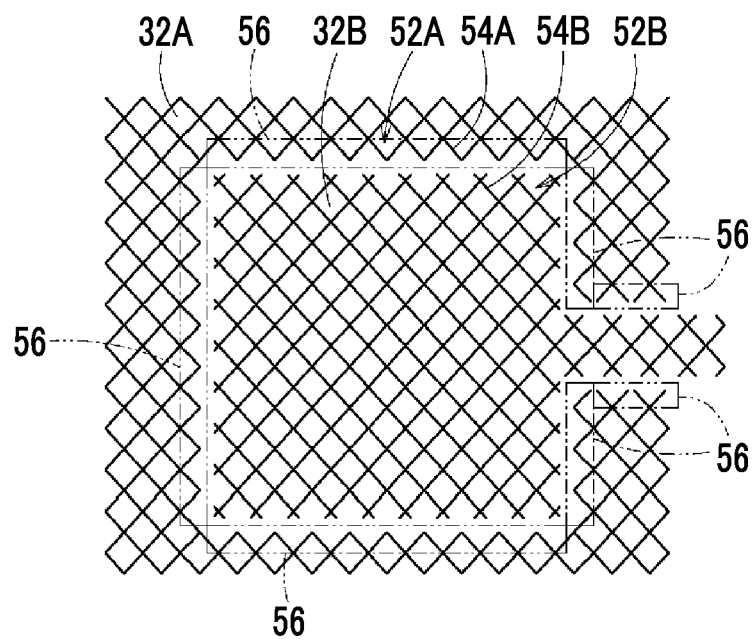
FIG. 5B is an enlarged view illustrating a main portion of the pattern illustrated in FIG. 5A.

In the example illustrated in FIGS. 3 and 4, the dummy pattern 46 which includes a plurality of grids 36 formed by thin metal wires is formed in a region represented by a two-dot chain line in FIG. 3 (a region between the first electrode 32A and the second electrode 32B, a region between the first electrodes 32A adjacent to each other, a region between the first electrode 32A and the extraction electrode 34, a region between the second electrode 32B and the extraction electrode 34, and a region between the extraction electrodes 34), as illustrated in FIG. 4. FIG. 5A illustrates the pattern of some of the first electrodes 32A corresponding to one column, a plurality of second electrodes 32B, each of which is partially surrounded by the first electrode 32A, and the extraction electrodes 34 which extend from the second electrodes 32B.

In the above-mentioned example, as schematically illustrated in FIG. 3 and FIG. 5A, for example, three sides of each second electrode 32B are surrounded by the surrounding portion 42 of the first electrode 32A. However, the second electrode 32B may be formed as follows.

That is, as illustrated in FIGS. 6A to 9B, each second electrode 32B may have a shape in which a plurality of branch portions 50 extend radially and the first electrode 32A may have a shape which surrounds at least the plurality of branch portions 50 of the second electrode 32B. In this case, a portion in which the first electrode 32A and the second electrode 32B face each other has a complicated shape. Therefore, it is possible to increase the initial capacitance between the first electrode 32A and the second electrode 32B and it is easy to detect a change in capacitance due to the touch or approach of a finger or a pen.

In general, in an electrode formed by thin metal wires, the percentage of a conductive portion is less than that in a transparent electrode film, such as an indium tin oxide (ITO) film. Therefore, the initial capacitance between the electrodes is significantly less than that in the transparent electrode film and there are limitations in improving the accuracy of detection. However, in this example, it is possible to increase the initial capacitance between the first electrode 32A and the second electrode 32B. Therefore, it is possible to improve the accuracy of detection.

In particular, it is preferable that the electrode has the following structure. First, FIG. 5B, FIG. 6B, FIG. 7B, FIG. 8B, and FIG. 9B are enlarged views illustrating main portions illustrated in FIG. 5A, FIG. 6A, FIG. 7A, FIG. 8A, and FIG. 9A, respectively. Here, attention is paid to a thin metal wire (referred to as a first thin metal wire 54A) forming a portion which faces one second electrode 32B in the outer periphery (referred to first outer periphery 52A) of the first electrode 32A. In addition, attention is paid to a thin metal wire (referred to as a second thin metal wire 54B) forming a portion which faces the first electrode 32A in the outer periphery (referred to as second outer periphery 52B) of one second electrode 32B.

When the total length of a path in which the first thin metal wire 54A and the second thin metal wire 54B face each other in parallel is L (mm) and an area surrounded by the second outer periphery 52B of the second electrode 32B is A (mm$^2$), the value of L (mm)/A (mm$^2$) is preferably equal to or greater than 1.0 (mm$^{-1}$). When the value of L (mm)/A (mm$^2$) is less than 1.0 (mm$^{-1}$), the initial capacitance between the first electrode 32A and the second electrode 32B is low and sensitivity is reduced.

Therefore, when the value of L (mm)/A (mm$^2$) is 1.0 (mm$^{-1}$), it is easy to detect a change in capacitance due to the touch or approach of a finger or a pen and it is possible to improve the accuracy of detection of a touch position. In FIGS. 5A to 9B, the dummy pattern 46 is not illustrated.

The total length L of the path may be calculated from the first thin metal wire 54A or the second thin metal wire 54B. In the examples illustrated in FIG. 5B, FIG. 6B, FIG. 7B, FIG. 8B, and FIG. 9B, the total length L of the path is calculated from the first thin metal wire 54A. The sum of the lengths of the thin metal wires surrounded by a frame 56 represented by a two-dot chain line is the total length L of the path.

As such, in the conductive film 14 according to this embodiment, the extraction electrode 34 formed in the sensor region 22 is less likely to be conspicuous and it is possible to improve visibility. In addition, the initial capacitance between the first electrode 32A and the second electrode 32B increases, which makes it possible to improve the accuracy of detection. The first electrode 32A, the second electrode 32B, and the extraction electrode 34 can be formed on only one main surface of the transparent base 26. This structure makes it possible to simplify a manufacturing process and to reduce the number of processes. As a result, it is possible to reduce costs.

In this embodiment, each of the first electrode 32A, the second electrode 32B, and the extraction electrode 34 is formed in the mesh pattern 38. The direction in which the thin metal wire forming the mesh pattern 38 extends is inclined with respect to the direction in which the extraction electrode 34 extends. The term "inclination" indicates that an angle formed between the extension direction of the thin metal wire and the extension direction of the extraction electrode 34 is an acute angle or an obtuse angle. When the angle is 0° or 90°, the thin metal wire extends at a right angle with respect to the size of a display region of the display panel 20. As a result, moire is likely to occur. In contrast, in this embodiment, as described above, since the extension direction of the thin metal wire is inclined with reference to the extension direction of the extraction electrode 34, moire is less likely to occur.

A first terminal wiring portion 58A which is formed by metal wires and is electrically connected to the end of each first electrode 32A of the conductive portion 28 and a second terminal wiring portion 58B which is formed by metal wires and is electrically connected to the end of each extraction electrode 34 of the conductive portion 28 are formed in the terminal wiring region 24.

In a case in which the conductive film 14 is used as the touch panel 10, the cover layer 16 is stacked on the conductive film 14 and a plurality of first terminal wiring portions 58A and a plurality of second terminal wiring portions 58B which are drawn from the conductive film 14 are connected to a control circuit (not illustrated) that controls, for example, a scanning operation.

A self-capacitance method or a mutual capacitance method can be preferably used as a touch position detection method.

In the self-capacitance method, the control circuit sequentially supplies a first pulse signal for detecting a touch position to the first terminal wiring portions 58A and sequentially supplies a second pulse signal for detecting a touch position to the second terminal wiring portions 58B.

When a fingertip comes into contact with or approaches the upper surface of the cover layer 16, the capacitance between the ground (GND) and a sensing portion which faces the touch position increases. Then, the waveform of a transmission signal from the first electrode 32A and the second electrode 32B corresponding to the sensing portion is different from the waveforms of transmission signals from the first electrodes 32A and the second electrodes 32B corresponding to other sensing portions. Therefore, the control circuit calculates the touch position on the basis of the transmission signal from the first electrode 32A and the second electrode 32B corresponding to the sensing portion.

In contrast, in the mutual capacitance method, the control circuit sequentially applies a voltage signal for detecting a touch position to the second electrodes 32B and sequentially performs a sensing process (the detection of the transmission signal) for the first electrodes 32A. When a fingertip comes into contact with or approaches the upper surface of the cover layer 16, the floating capacitance of the finger is added in parallel to parasitic capacitance (initial capacitance) in the sensing portion which faces the touch position. Then, the waveform of the transmission signal from the first electrode 32A corresponding to the sensing portion is different from the waveforms of transmission signals from the first electrodes 32A corresponding to other sensing portions. Therefore, the control circuit calculates the touch position on the basis of the order in which the voltage signal is supplied to the second electrodes 32B and the transmission signal supplied from the first electrode 32A.

The use of the touch position detection method, such as the self-capacitance method or the mutual capacitance method, makes it possible to detect each touch position even when two fingers come into contact with or approach the upper surface of the cover layer 16 at the same time.

In addition, techniques related to a projected-capacitive detection circuit are disclosed in, for example, U.S. Pat. No. 4,582,955A, U.S. Pat. No. 4,686,332A, U.S. Pat. No. 4,733,222A, U.S. Pat. No. 5,374,787A, U.S. Pat. No. 5,543,588A, U.S. Pat. No. 7,030,860B, and US2004/0155871A.

Next, a preferred aspect of the conductive film according to this embodiment will be described below.

(Transparent Base)

Examples of the transparent base 26 include a plastic film, a plastic plate, and a glass plate.

Examples of the raw material forming the plastic film and the plastic plate include polyesters, such as polyethylene terephthalate (PET) and polyethylene naphthalate (PEN), polyolefins, such as polyethylene (PE), polypropylene (PP), polystyrene, and ethylene vinyl acetate (EVA), vinyl-based resins, polycarbonate (PC), polyamide, polyimide, acrylic resin, triacetylcellulose (TAC), and cycloolefin polymer (COP).

It is preferable that the transparent base 26 is a plastic film or a plastic plate made of a material having a melting point of about 290° C. or less, such as PET (melting point: 258° C.), PEN (melting point: 269° C.), PE (melting point: 135° C.), PP (melting point: 163° C.), polystyrene (melting point: 230° C.), polyvinyl chloride (melting point: 180° C.), polyvinylidene chloride (melting point: 212° C.), or TAC (melting point: 290° C.). In particular, the transparent base 26 is preferably a PET plate in terms of, for example, light transmittance and workability. Since the conductive film 14 applied to the touch panel needs to be transparent, it is preferable that the degree of transparency of the transparent base 26 is high.

(Grid)

Each grid 36 has a polygonal shape. Examples of the polygon include a triangle, a quadrangle (for example, a square, a rectangle, a parallelism, or a trapezoid), a pentagon, and a hexagon. In addition, some of the sides forming the polygon may be curved.

It is preferable that the pitch of the mesh pattern 38 is in the range of 200 μm to 300 μm. Here, the pitch of the mesh pattern 38 means a distance between the center points (the centers of gravity) of two adjacent grids 36. When the pitch is too small, the opening ratio and light transmittance are reduced, which results in a reduction in transparency. On the other hand, when the pitch is too large, the opening ratio and light transmittance are improved, but the electric resistance of the first electrode 32A and the second electrode 32B increases. As a result, the accuracy of detection of the touch position is reduced. In addition, when the pitch is too large, the distance between the first electrode 32A and the second electrode 32B which are adjacent to each other is large and the initial capacitance between the first electrode 32A and the second electrode 32B is low, which results in a reduction in the accuracy of detection. Therefore, in a case in which the pitch of the mesh pattern 38 is in the above-mentioned range, it is possible to maintain transparency at a high level. When the conductive film is attached to the display panel 20 of the display device 18, it is possible to view a displayed image without discomfort. In addition, it is possible to improve the accuracy of detection of a touch position.

(Thin Metal Wire and Metal Wire)

The width of the thin metal wire is preferably equal to or greater than 0.1 μm and equal to or less than 15 μm, more preferably equal to or greater than 1 μm and equal to or less than 9 μm, and most preferably equal to or greater than 2 μm and equal to or less than 7 μm. The surface electrical resistance of the first electrode 32A and the second electrode 32B is preferably in the range of 0.1 ohms/square to 100 ohms/square. The lower limit of the surface electrical resistance is preferably equal to or greater than 1 ohms/square, 3 ohms/square, 5 ohms/square, and 10 ohms/square. The upper limit of the surface electrical resistance is preferably equal to or less than 70 ohms/square and 50 ohms/square.

The thin metal wires forming the first terminal wiring portion 58A and the second terminal wiring portion 58B formed in the terminal wiring region 24 and the thin metal wires forming the first electrode 32A, the second electrode 32B, and the extraction electrode 34 are made of a single conductive material. The single conductive material is a metal material, such as silver, copper, or aluminum, or an alloy including at least one of them.

The opening ratio of the conductive film 14 according to this embodiment is preferably equal to or greater than 85%, more preferably equal to or greater than 90%, and most preferably equal to or greater than 95% in terms of visible light transmittance. The opening ratio is the proportion of a translucent portion other than the thin metal wires to the conductive film. For example, the opening ratio of a square lattice with a wire width of 6 μm and a thin wire pitch of 240 μm is 95%.

As illustrated in FIG. 1, it is preferable that alignment marks 60 for positioning which are used when the conductive film 14 is provided in the display panel 20 are formed at, for example, the corners of the conductive film 14.

In the above-mentioned example, the conductive film 14 is applied to the projected capacitive touch panel 10. However, the conductive film 14 may be applied to a surface capacitive touch panel or a resistive touch panel.

The conductive film 14 according to this embodiment may be used as an electromagnetic wave shield film of the display device 18 or an optical film provided in the display panel 20 of the display device 18, in addition to the conductive film for the touch panel of the display device 18. Examples of the display device 18 include a liquid crystal display, a plasma display, an organic EL display, and an inorganic EL display.

Next, a preferred method for forming, for example, the first electrode 32A, the second electrode 32B, and the extraction electrode 34 are formed on the transparent base 26 will be described in brief.

For example, the first electrode 32A, the second electrode 32B, and the extraction electrode 34 can be preferably formed by a microcontact printing patterning method or a silver salt method in order to obtain a pattern with a small line width. It is preferable to use the silver salt method without using a stamp that wears out, in order to obtain a large number of repetitive random patterns.

The microcontact printing patterning method is a method which obtains a pattern with a small line width using a microcontact printing method. The microcontact printing method is a method which brings a thiol solution as ink into contact with a gold base, using an elastic stamp made of polydimethylsiloxane, to form a pattern of a monomolecular film (see Whitesedes et al., Angew. Chem. Int. Ed., 1998, vol. 37, p. 550).

For example, a representative process of the microcontact printing patterning method is as follows. That is, first, a base is coated with a metal material (for example, a PET base is sputter-coated with silver).

Then, a mask of a monomolecular film is stamped onto the metal-coated base by the microcontact printing method. Then, the metal material coated on the base is removed by etching, except for the pattern below the mask.

For example, the detailed process of the method is described in paragraph <0104> of JP2012-519329A.

In contrast, the silver salt method is a method which exposes and develops a photosensitive material having a photosensitive layer containing a silver salt to obtain a mesh pattern of the first electrode 32A, a mesh pattern of the second electrode 32B, and a mesh pattern of the extraction electrode 34. The detailed process of the method is described in paragraphs <0163> to <0241> of JP2009-004348A.

The invention can be used in combination with the techniques disclosed in Japanese Unexamined Patent Application Publications and International Publication Pamphlets respectively listed in the following Tables 1 and 2. For example, in Tables 1 and 2, notations of "JP", "A", and "WO", are omitted.

TABLE 1

| | | | | |
|---|---|---|---|---|
| 2004-221564 | 2004-221565 | 2007-200922 | 2006-352073 | 2006-228469 |
| 2007-235115 | 2007-207987 | 2006-012935 | 2006-010795 | 2007-072171 |
| 2006-332459 | 2009-21153 | 2007-226215 | 2006-261315 | 2006-324203 |
| 2007-102200 | 2006-228473 | 2006-269795 | 2006-336090 | 2006-336099 |
| 2006-228478 | 2006-228836 | 2007-009326 | 2007-201378 | 2007-335729 |
| 2006-348351 | 2007-270321 | 2007-270322 | 2007-178915 | 2007-334325 |
| 2007-134439 | 2007-149760 | 2007-208133 | 2007-207883 | 2007-013130 |
| 2007-310091 | 2007-116137 | 2007-088219 | 2008-227351 | 2008-244067 |
| 2005-302508 | 2008-218784 | 2008-227350 | 2008-277676 | 2008-282840 |

TABLE 1-continued

| | | | | |
|---|---|---|---|---|
| 2008-267814 | 2008-270405 | 2008-277675 | 2008-300720 | 2008-300721 |
| 2008-283029 | 2008-288305 | 2008-288419 | 2009-21334 | 2009-26933 |
| 2009-4213 | 2009-10001 | 2009-16526 | 2008-171568 | 2008-198388 |
| 2008-147507 | 2008-159770 | 2008-159771 | 2008-235224 | 2008-235467 |
| 2008-218096 | 2008-218264 | 2008-224916 | 2008-252046 | 2008-277428 |
| 2008-241987 | 2008-251274 | 2008-251275 | 2007-129205 | |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

The invention is not particularly limited to the above-described embodiment and various modifications and changes of the invention can be made without departing from the scope and spirit of the invention.

For example, the first electrode 32A and the second electrode 32B may be transparent electrode films made of an indium tin oxide (ITO).

Example 1

Hereinafter, the invention will be described in more detail using the following examples. In the following examples, materials, the amounts of materials used, ratios, the content of processes, and the procedures of processes can be appropriately modified without departing from the scope and spirit of the invention. Therefore, the scope of the invention is not limited by the following examples.

In Examples 1 to 5, errors in the detection of a touch position were checked. Table 3 illustrates the breakdown and evaluation results of Examples 1 to 5.

Example 1

(Photosensitive Silver Halide Material)

An emulsion was prepared which contained silver iodo-bromochloride particles having a sphere-equivalent average diameter of 0.1 μm (I=0.2% by mol, Br=40% by mol) dispersed in an aqueous medium containing 10.0 g of gelatin per 150 g of Ag.

In addition, $K_3Rh_2Br_9$ and $K_2IrCl_6$ were added to the emulsion at a concentration of $10^{-7}$ (mol/mol-Ag) to dope the silver bromide particles with Rh ions and Ir ions. $Na_2PdCl_4$ was added to the emulsion and the resultant emulsion was subjected to gold-sulfur sensitization, using chlorauric acid and sodium thiosulfate. Then, the emulsion was used as an emulsion A. Then, the amount of $K_3Rh_2Br_9$ in the emulsion A was reduced to prepare an emulsion of which the sensitivity was doubled. The emulsion was used as an emulsion B.

(Formation of Photosensitive Layer)

Then, the emulsion and a gelatin hardening agent were applied onto the surface of the transparent base 26 (which was made of PET in this example) with an A4 size (210 mm×297 mm) such that the amount of silver applied was 10 g/m². At that time, the volume ratio of Ag/gelatin was 2/1. The thickness of the transparent base 26 was 100 μm. Multi-layer coating was performed such that the amount of emulsion B in a lower layer was 5 g/m² and the amount of emulsion A in an upper layer was 5 g/m². In this way, a photosensitive silver halide material having a photosensitive layer with a thickness of 1.5 μm was obtained.

(Exposure)

An exposure process was performed for the obtained photosensitive silver halide material. The photosensitive silver halide material was exposed in the pattern illustrated in FIGS. 3, 5A, and 5B. The exposure process was performed through a photomask having the above-mentioned patterns, using parallel light emitted from a high-pressure mercury lamp as a light source.

(Development Process)

Formulation of 1 L of Developer

| | |
|---|---|
| Hydroquinone | 20 g |
| Sodium sulfite | 50 g |
| Potassium carbonate | 40 g |
| Ethylenediaminetetraacetie acid | 2 g |
| Potassium bromide | 3 g |
| Polyethylene glycol 2000 | 1 g |
| Potassium hydroxide | 4 g |
| pH adjusted to | 10.3 |

Formulation of 1 L of Fixer

| | |
|---|---|
| Ammonium thiosulfate solution (75%) | 300 ml |
| Ammonium sulfite monohydrate | 25 g |
| 1,3-Diaminopropanetetraacetic acid | 8 g |
| Acetic acid | 5 g |
| Aqueous ammonia (27%) | 1 g |
| pH adjusted to | 6.2 |

The exposed photosensitive material was developed under processing conditions (development: at 35° C. for 30 seconds; fixing: at 34° C. for 23 seconds; and water washing: under running water (5 L/min) for 20 seconds), using the above-described developing agent and an automatic developing machine FG-710PTS manufactured by Fujifilm Corporation, to obtain a conductive film according to Example 1.

(Ratio of Total Length L of Path and Area A of Electrode)

In the obtained conductive film, the total length L (mm) of the path in which the first thin metal wire 54A and the second thin metal wire 54B faced each other in parallel and the area A (mm²) surrounded by the second outer periphery 52B of the second electrode 32B were calculated and the ratio of the total length L of the path to the area A (the total length L of the path/the area A) was calculated. In Example 1, the total length L of the path/the area A was 0.8 (mm$^{-1}$).

Example 2

Figure 6A:
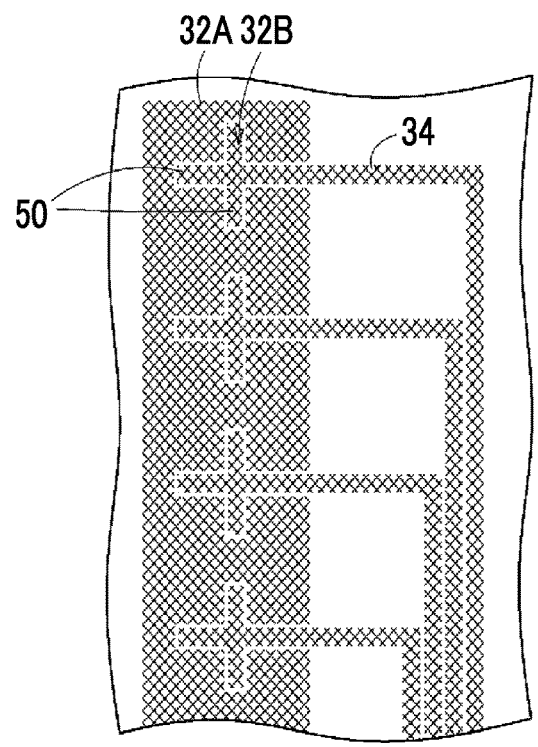
FIG. 6A is a plan view illustrating a first modification example of the pattern illustrated in FIG. 5A
Figure 6B:
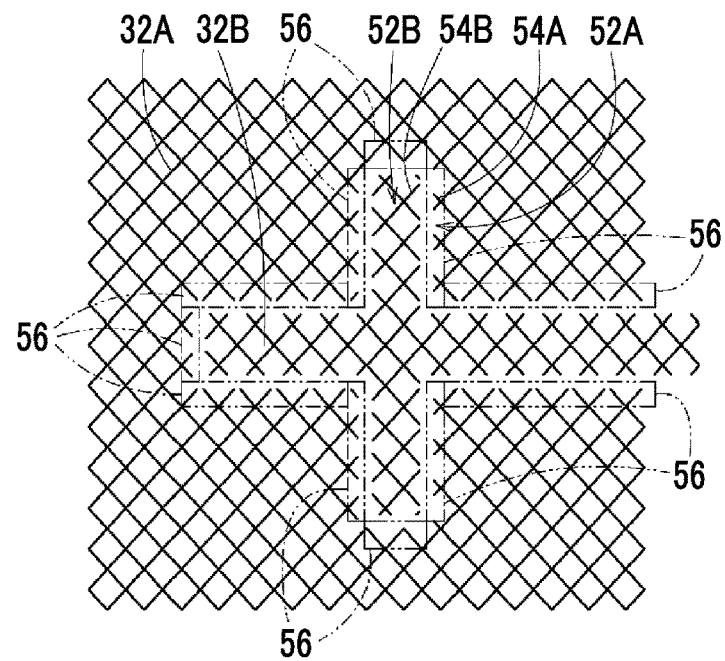
FIG. 6B is an enlarged view illustrating a main portion of the pattern illustrated in FIG. 6A.

A conductive film according to Example 2 was obtained by the same method as that in Example 1 except that the first electrode 32A and the second electrode 32B were formed in the pattern illustrated in FIGS. 6A and 6B, instead of the pattern illustrated in FIG. 3. In Example 2, the total length L of the path/the area A was 0.9 (mm$^{-1}$).

Example 3

Figure 7A:
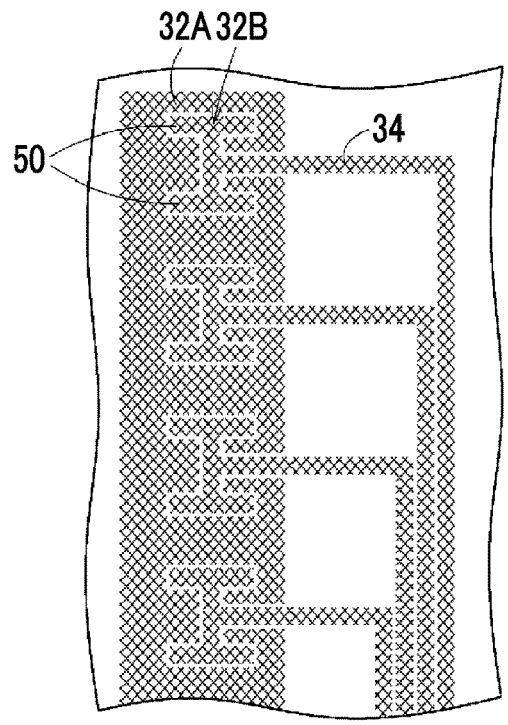
FIG. 7A is a plan view illustrating a second modification example of the pattern illustrated in FIG. 5A
Figure 7B:
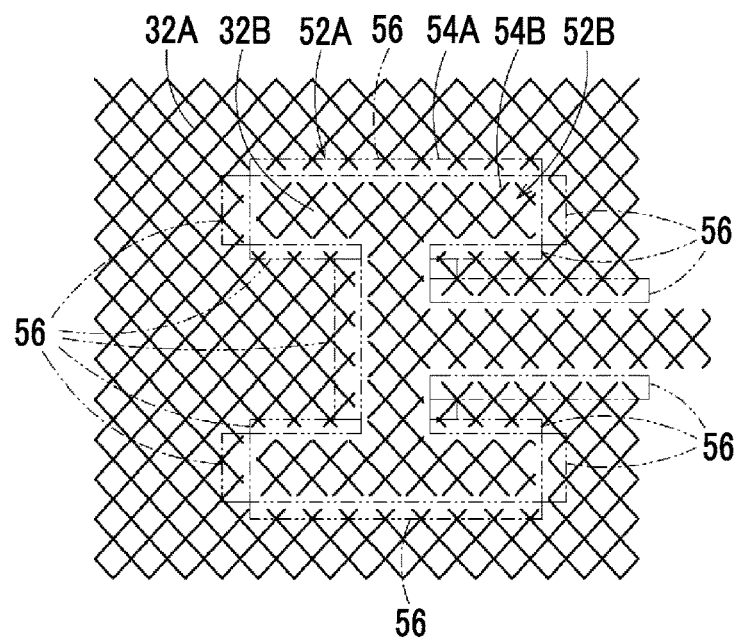
FIG. 7B is an enlarged view illustrating a main portion of the pattern illustrated in FIG. 7A.

A conductive film according to Example 3 was obtained by the same method as that in Example 1 except that the first electrode 32A and the second electrode 32B were formed in the pattern illustrated in FIGS. 7A and 7B, instead of the pattern illustrated in FIG. 3. In Example 3, the total length L of the path/the area A was 1.0 (mm$^{-1}$).

Example 4

Figure 8A:
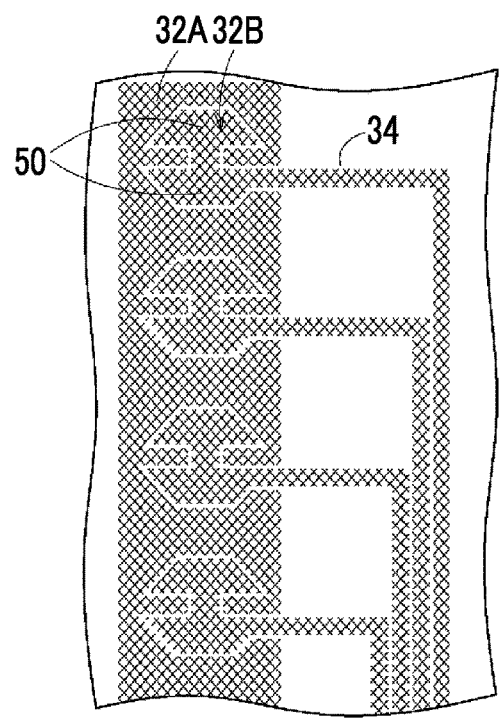
FIG. 8A is a plan view illustrating a third modification example of the pattern illustrated in FIG. 5A
Figure 8B:
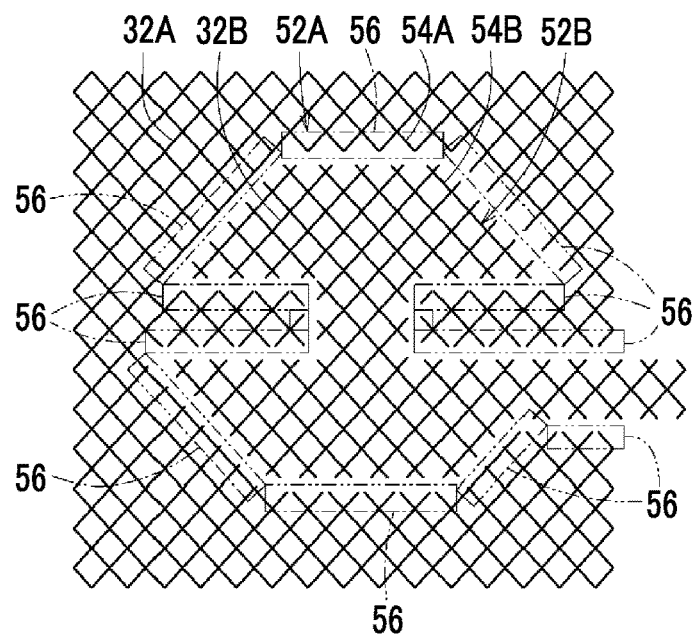
FIG. 8B is an enlarged view illustrating a main portion of the pattern illustrated in FIG. 8A.

A conductive film according to Example 4 was obtained by the same method as that in Example 1 except that the first electrode 32A and the second electrode 32B were formed in the pattern illustrated in FIGS. 8A and 8B, instead of the pattern illustrated in FIG. 3. In Example 4, the total length L of the path/the area A was 1.2 (mm$^{-1}$).

Example 5

Figure 9A:
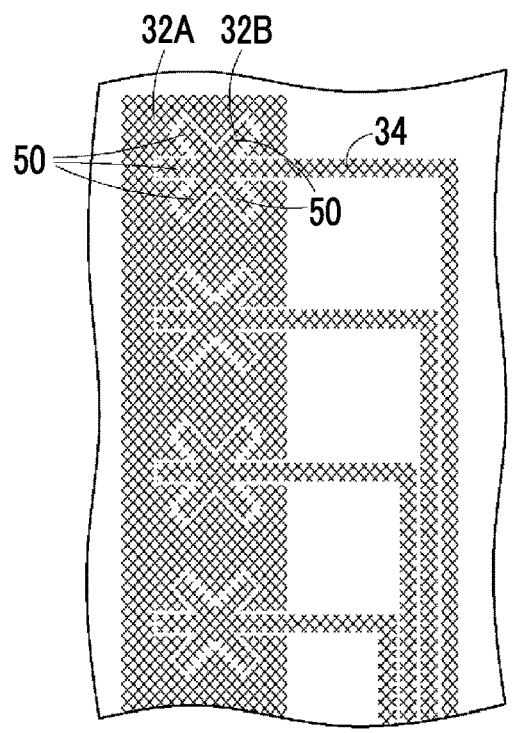
FIG. 9A is a plan view illustrating a fourth modification example of the pattern illustrated in FIG. 5A
Figure 9B:
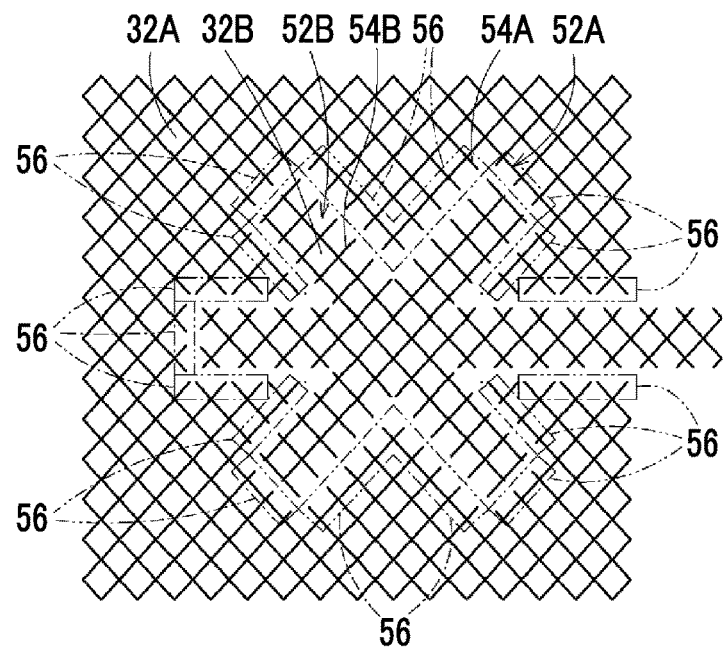
FIG. 9B is an enlarged view illustrating a main portion of the pattern illustrated in FIG. 9A.

A conductive film according to Example 5 was obtained by the same method as that in Example 1 except that the first electrode 32A and the second electrode 32B were formed in the pattern illustrated in FIGS. 9A and 9B, instead of the pattern illustrated in FIG. 3. In Example 5, the total length L of the path/the area A was 1.5 (mm$^{-1}$).

(Detection Error)

Touch panels according to Examples 1 to 5 were manufactured using the conductive films according to Examples 1 to 5. A probe robot sequentially came into contact with 10000 predetermined contact points with a diameter of 5 mm on the surface of each touch panel to detect each touch position. Then, the detection results of 10000 points were compared with set values corresponding thereto. A case in which a 9973rd value from the smallest absolute value of a difference vector between the detected position and the set position was equal to or greater than 2 mm was represented by "N". A case in which the 9973rd value was equal to or greater than 1.5 mm and less than 2 mm was represented by "C". A case in which the 9973rd value was equal to or greater than 1.3 mm and less than 1.5 mm was represented by "B". A case in which the 9973rd value was less than 1.3 mm was represented by "A".

(Evaluation Results)

The evaluation results are shown in the following Table 3.

TABLE 3

| | L/A (mm$^{-1}$) | Detection error (%) |
|---|---|---|
| Example 1 | 0.8 | B |
| Example 2 | 0.9 | B |
| Example 3 | 1.0 | A |
| Example 4 | 1.2 | A |
| Example 5 | 1.5 | A |

As can be seen from Table 3, the detection error is small in all of Examples 1 to 5, which is preferable. In particular, in Examples 3 to 5, the total length L of the path/the area A is equal to or greater than 1.0. Therefore, the evaluation result of the detection error is "A", which is more preferable.

EXPLANATION OF REFERENCES

10: touch panel
12: sensor body
14: conductive film
18: display device
20: display panel
22: sensor region
24: terminal wiring region
26: transparent base
28: conductive portion
30: transparent adhesive layer
32A: first electrode
32B: second electrode
34: extraction electrode
36: grid
38: mesh pattern
40: strip portion
42: surrounding portion
46: dummy pattern
50: branch portion
52A: first outer periphery
52B: second outer periphery
54A: first thin metal wire
54B: second thin metal wire
58A: first terminal wiring portion
58B: second terminal wiring portion

What is claimed is:

1. A touch sensor comprising:
a base;
a first electrode and a second electrode that are formed on a main surface of the base so as to face each other; and
an extraction electrode that is formed on the main surface of the base and is extended from the second electrode,
wherein the first electrode has a shape which surrounds a portion of the second electrode, and
at least the extraction electrode is formed in a mesh pattern including a plurality of grids which are formed by thin metal wires.

2. The touch sensor according to claim 1,
wherein a direction in which the thin metal wire forming the mesh pattern extends is inclined with respect to a direction in which the extraction electrode extends.

3. The touch sensor according to claim 1,
wherein, when a total length of a path in which a thin metal wire forming a portion that faces the second electrode in the outer periphery of the first electrode and a thin metal wire forming a portion that faces the first electrode in the outer periphery of the second electrode face each other in parallel is L mm and an area that is surrounded by the outer periphery of the second electrode is A mm$^2$, a value of L/A is equal to or greater than 1.0 mm$^{-1}$.

4. The touch sensor according to claim 2,
wherein, when a total length of a path in which a thin metal wire forming a portion that faces the second electrode in the outer periphery of the first electrode and a thin metal wire forming a portion that faces the first electrode in the outer periphery of the second electrode face each other in parallel is L mm and an area that is surrounded by the outer periphery of the second electrode is A mm$^2$, a value of L/A is equal to or greater than 1.0 mm$^{-1}$.

5. The touch sensor according to claim 1,
wherein a pitch of the mesh pattern is equal to or greater than 200 μm and equal to or less than 300 μm.

6. The touch sensor according to claim 2,
wherein a pitch of the mesh pattern is equal to or greater than 200 μm and equal to or less than 300 μm.

7. The touch sensor according to claim 3,
wherein a pitch of the mesh pattern is equal to or greater than 200 μm and equal to or less than 300 μm.

8. The touch sensor according to claim 1,
wherein a plurality of the second electrodes are provided, and
the plurality of second electrodes are scattered in the form of islands.

9. The touch sensor according to claim 8,
wherein the plurality of second electrodes which are scattered in the form of islands are arranged in a first direction, and
the first electrode includes a strip portion which extends in a strip shape in the first direction and a surrounding portion which protrudes from the strip portion and surrounds a portion of the second electrode.

10. The touch sensor according to claim 9,
wherein a plurality of the first electrodes are provided,
the plurality of second electrodes which are scattered in the form of islands are arranged in a matrix, and
the plurality of first electrodes are arranged in a second direction perpendicular to the first direction.

11. The touch sensor according to claim 10,
wherein, in each extraction electrode which extends from each of the plurality of second electrodes arranged in the first direction, a region which is adjacent to the corresponding first electrode extends in the first direction.

12. The touch sensor according to claim 11,
wherein the first electrode and the second electrode are formed in a mesh pattern including a plurality of grids which are formed by thin metal wires,
a dummy pattern which is formed by thin metal wires and is not connected to the first electrode and the second electrode is formed at least between the first electrode and the second electrode, and
the plurality of grids are uniformly arranged across at least the first electrode and the second electrode in a top view.

13. The touch sensor according to claim 12,
wherein a dummy pattern which is formed by thin metal wires and is not connected to a plurality of the extraction electrodes is formed between the plurality of extraction electrodes, and
the plurality of grids are uniformly arranged across the first electrode, the second electrode, and the extraction electrode in a top view.

14. The touch sensor according to claim 1,
wherein each of the second electrodes has a shape in which a plurality of branch portions extend radially, and
the first electrode has a shape which surrounds at least the plurality of branch portions of the second electrode.

15. The touch sensor according to claim 14,
wherein the branch portions which extend radially in the second electrode are scattered in the form of islands.

16. The touch sensor according to claim 15,
wherein the plurality of branch portions are arranged in the first direction.

17. The touch sensor according to claim 1,
wherein the first electrode is formed in a mesh pattern including a plurality of grids which are formed by thin metal wires.

18. The touch sensor according to claim 1,
wherein the second electrode is formed in a mesh pattern including a plurality of grids which are formed by thin metal wires.

19. A touch panel comprising:
the touch sensor according to claim 1 that is provided on the display panel of the display device,
wherein the touch sensor includes:
the base;
the first electrode and the second electrode that are formed on the main surface of the base so as to face each other; and
the extraction electrode that is formed on the main surface of the base and is extended from the second electrode,
the first electrode has a shape which surrounds a portion of the second electrode, and
at least the extraction electrode is formed in a mesh pattern including a plurality of grids which are formed by thin metal wires.

20. The touch panel according to claim 19,
wherein the touch sensor includes a sensor region that corresponds to a display screen of the display panel and a terminal wiring region that corresponds to an outer peripheral portion of the display panel, and
the extraction electrode, the first electrode, and second electrode are formed in the sensor region.

21. A touch panel comprising:
a base;
a first electrode and a second electrode that are formed on a main surface of the base so as to face each other; and
an extraction electrode that is formed on the main surface of the base and is extended from the second electrode,
wherein the first electrode has a shape which surrounds a portion of the second electrode, and
at least the extraction electrode is formed in a mesh pattern including a plurality of grids which are formed by thin metal wires.

22. An electrode structure comprising:
a first electrode and a second electrode facing each other; and
an extraction electrode that is extended from the second electrode,
wherein the first electrode has a shape which surrounds a portion of the second electrode, and
at least the extraction electrode is formed in a mesh pattern including a plurality of grids which are formed by thin metal wires.

* * * * *